Dec. 17, 1946.  E. G. SPANGLER  2,412,841
AIR AND WATER SEPARATOR FOR REMOVING AIR OR WATER MIXED
WITH HYDROCARBONS COMPRISING A CARTRIDGE CONTAINING
A WADDING OF WOODEN SHAVINGS
Filed March 14, 1944  2 Sheets-Sheet 2
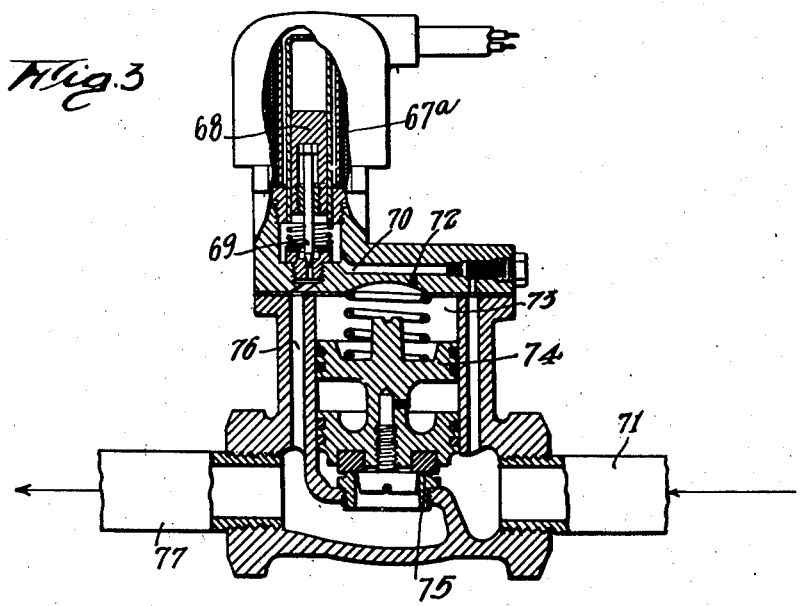
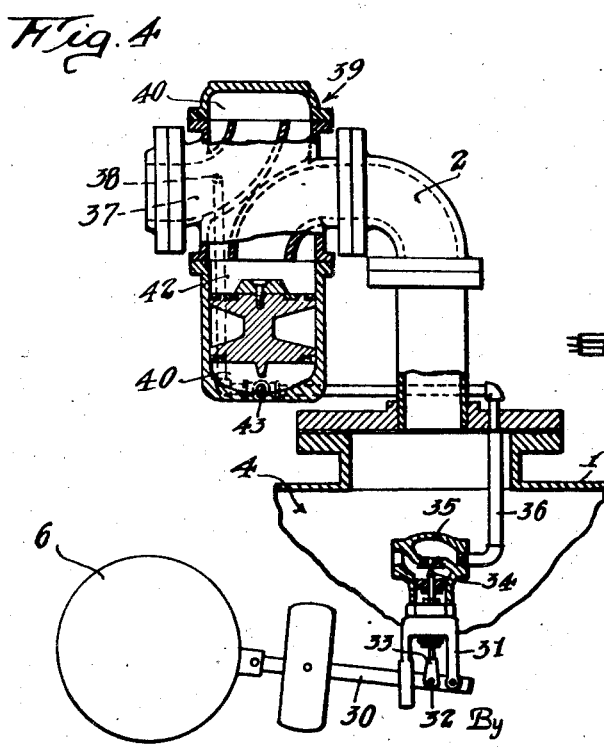
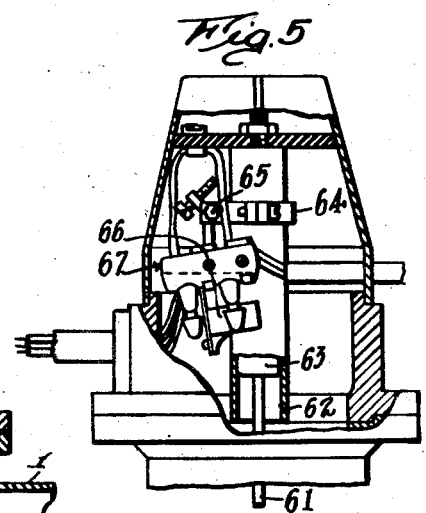
Inventor
Earl G. Spangler
By Lyon & Lyon
Attorneys Patented Dec. 17, 1946

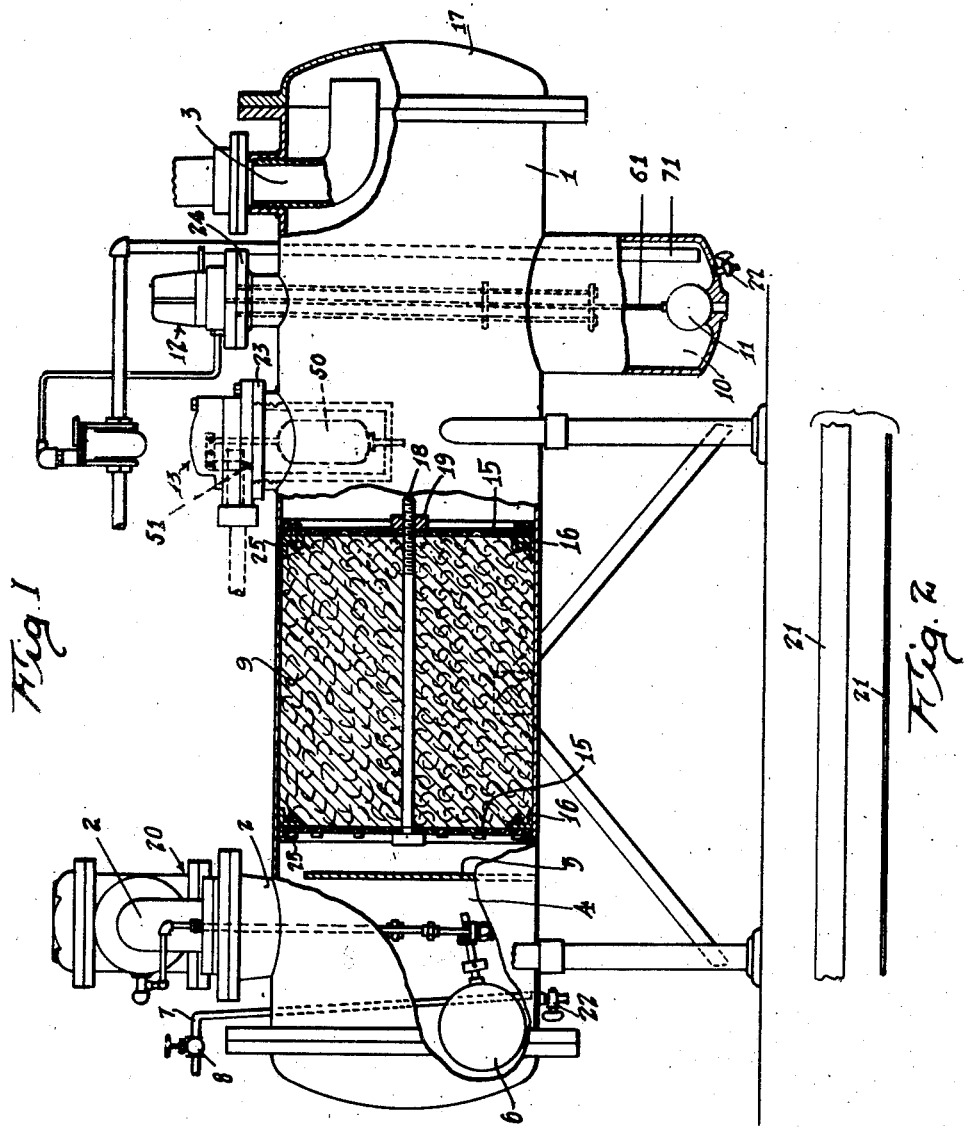

2,412,841

UNITED STATES PATENT OFFICE 2,412,841

AIR AND WATER SEPARATOR FOR REMOVING AIR OR WATER MIXED WITH HYDROCARBONS, COMPRISING A CARTRIDGE CONTAINING A WADDING OF WOODEN SHAVINGS

Earl G. Spangler, La Canada, Calif.

Application March 14, 1944, Serial No. 526,461

2 Claims. (Cl. 210—43)

My invention relates to an air and water separator, and more specifically to one for separating the air and water from gasoline and other hydrocarbons.

Gasoline and other hydrocarbons often contain a considerable quantity of water and air in an emulsified and partly homogenized condition. Also in many of the methods of pumping gasoline and other hydrocarbons, water is used to force the flow of the hydrocarbons, and protecting means must be used to prevent this water from being mixed with the hydrocarbons.

The use of a gasoline containing quantities of water, is impossible in an airplane motor. Water in an emulsified or homogeneous combination with gasoline, will settle out upon standing, and foul or plug strainers and jets. It is therefore necessary to separate the water from the gasoline. In pumping systems a slug of straight water will get in the line and be forced through before the same can be shut off.

It is therefore an object of my invention to separate the water from the hydrocarbons whether the same is emulsified or in any other condition.

It is another object of my invention to separate air from the gasoline and other hydrocarbons.

Another object of my invention is to provide an air and water separator which will be completely automatic, and require no attention.

Other objects and advantages of my invention will be apparent from the following description of the preferred embodiments thereof.

In the drawings:

Fig. 1 is a side elevation partially in section.

Fig. 2 is an elevation and side view of an element.

Figure 3 is a cross-section of the bleed off valve.

Figure 4 is a cross-section of the inlet valve.

Figure 5 is a cross-section of the means for controlling the bleed off valve.

An air and water separator constructed in accordance with my invention, comprises a tank 1 which has an inlet 2 and an outlet 3. The gasoline or other hydrocarbons are forced into the tank through the inlet 2 and out through the outlet 3. To remove the water contained in the gasoline or other hydrocarbons passing through the tank 1, a compartment 4 is constructed directly below the inlet 2 by welding to the bottom and sides of the tank a baffle 5. If the water which is in large quantities such as a slug which is being used to force the gasoline through the line, enters the inlet 2, it settles to the bottom of the compartment 4. To prevent this water from passing on over and out through the tank, a float 6 is provided which has a specific gravity that causes it to sink in gasoline, but float in water. The float 6 when raised by water, actuates a valve 20 which can be of any type which shuts off the inlet 2 until the slug of water has been bled off through the bleed-off pipe 7 and valve 8. A preferred type of valve for opening and closing the inlet to my separator comprises a main valve and a pilot valve. The pilot valve is actuated by the float 6 carried on a lever 30 pivoted on the hanger 31. Pivoted at 32 is a clevis 33 which carries a needle valve 34 for opening and closing a port on the pilot valve 35. The pilot valve 35 opens directly into the compartment 4. A bleed off tube 36 is connected to the other side of the pilot valve 35. This tube runs into the inlet 37 through a restricted orifice 38, and the tube 36 also enters the valve chamber 40 at 43 on the lower side of the main valve 39. When the valve 35 is closed, the normal line pressure in the inlet 37 passes through the restricted orifice 38 into the chamber 40 below the main piston valve 39 and forces the same upwardly so that it seats against the end of the inlet 2, completely closing the same. When the main float 6 falls, it opens the pilot valve 35 which bleeds off the pressure in the chamber 40, reducing the pressure on the bottom of the main piston valve 39, allowing the pressure in the chamber 42 to open the main piston valve 39 and to permit the flow through the intake 37 into the chamber 42 and out through the inlet 2 into the chamber 4. Of course, if a slug of water comes over with the hydrocarbons the float 6 will rise, closing the pilot valve 35, and the pressure builds up in the chamber 40 causing the main piston valve 39 to seal the inlet tube shutting down the operation of my separator until the water has been bled off. However, emulsified or partially homogenized water or air suspended in the gasoline or other hydrocarbon, will not be so easily separated. To separate this, a cartridge 9 of material is positioned in the tank between the inlet 2 and the outlet 3. This material has the peculiar characteristic of separating water and air from the gasoline, by changing the velocities and pressures of the fluid in its passage through baffling and cleaving the fluid. This breaks the surface tension of the water particles, allowing the water particle to coalesce and form globules of water of the size upon which gravity will act, and cause the same to settle out to the bottom, where it settles in the sump 10 and can be bled off by the float 11 which actuates a bleed-off valve 12. This float 11 is similar to the float 6, in that it will sink in gasoline but will float in water. The air is caused to coalesce into large bubbles while passing through the cartridge 9, which enter the dome 13. In the dome 13 is a float 50 (buoyant in gasoline) which opens the air bleed-off valve 51 when sufficient air is entrapped within the dome 13 to lower the liquid level.

In a separator constructed in accordance with the preferred form of my invention, the float 11 is connected to a "Magnetrol." In Figure 5 is shown a "Magnetrol." Of course, any type of valve means can be actuated by the float 11, but for safety features I have found that the "Magnetrol" is safer when used with hydrocarbons. The float 11 is connected to the "Magnetrol" by a push rod 61 which leaves the main tank 1 through a sealed sleeve 62. At the upper end of the push rod 61 is carried a steel sleeve 63. A hanger 64 carries a pivot 65 upon which swings a magnet 66. Mounted on the hanger for the magnet 66 is a mercury switch 67. When the float 11 falls to the bottom of the sump 10, the steel sleeve 63 is drawn downwardly into the sleeve 62. When the water fills the sump 10, the float 11 rises, pushing the sleeve 63 upwardly, and because of the attraction of the magnet 66 for this sleeve, the magnet 66 swings upwardly with sleeve 63 causing the mercury switch to tilt making an electrical connection which is wired to complete electrical circuit to energize the solenoid 67ª. The solenoid 67ª has a core 68 which carries a needle valve 69. The needle valve 69 closes the passage 70 which connects with the bleed off discharge 71. The passage 70 is ported at 72 into the valve chamber 73 above the spring loaded piston valve 74. The pressure from the main separator tank 1 through the bleed off discharge 71 into the port 72 forces the piston valve 74 to seal the valve 75. When, however, the solenoid 67ª is energized and the needle valve 69 opens, the pressure in the chamber 73 is bled off through the passage 76 allowing the pressure on the under surface of the piston valve 74 to raise the same and discharge the water from the sump out through the valve 75 and the discharge pipe 77.

Many types of baffles and substances have been used in the place of the cartridge 9, but none secure the complete separation of the air and water from the hydrocarbons, as does the particular cartridge used in my separator. The cartridge used in my separator, consists of a special type of what could be called excelsior. The shape of the particular elements of the excelsior which will cause the most successful baffle and cleavage of the fluid, consists of wood shavings 21 which are substantially a quarter of an inch in width, and between .007 and .031 inch in thickness.

While other sizes of excelsior will operate to separate air and water from the hydrocarbons, I have found that the particular size just described, greatly increases the efficiency of the separation. The excelsior must be completely resin-free to prevent contaminating the gasoline or other hydrocarbons. After de-resining, it is then wadded up and compressed until the cartridge 9 has a density of substantially 6.5 pounds per square foot. This is achieved by the use of the heavy screens 15 which are placed in the tank between the angles 16. The outlet fitting 3 threadedly engages the tank 1. The valve 12 carrying the float 11 and the air-dome 13, are bolted to collars 23 and 24 respectively, to permit their removal to give access to the interior of the tank 1. Upon removal of the outlet fitting 3, the valve 12 and the air-dome 13, and the end 17 of the tank 1, the screens 15 can then be positioned against the angles 16. After the cartridge 9 has been inserted, the bolt 18 is passed through the centers of the screen, and the nut 19 is threaded on the bolt 18 to squeeze the screens 15 together to place compression on the cartridge 9. To prevent bulging of the screens 15, I provide nuts and bolts 25 around their circumferences, to permanently bind the edges of the screens 15 to the angles 16. By removal of the end 17 and the nut 19 the cartridge can be changed when the same becomes contaminated by dirt and other impurities in the gasoline.

To be sure and clean all water from the sumps 4 and 10, pet cocks 22 can be installed to drain the sumps.

While I have described the preferred embodiment of my invention as incorporating automatic means for bleeding off the air and water separated from the hydrocarbons, the same can be dispensed with and hand-actuated valves used.

I have described my invention in detail, but I am not limited to any of the details set forth except as described in the following claims.

I claim:

1. In a separator, a cartridge through which hydrocarbons are passed to remove air or water mixed with said hydrocarbons, comprising a wadding of wooden shavings having a density of substantially 6.5 pounds per cubic foot, said wadding being composed of ribbons substantially one-quarter of an inch wide, and between .007 and .031 inch in thickness, said wooden shavings being resin free.

2. In a separator, a tank having an inlet and an outlet, a cartridge positioned between said inlet and said outlet, said cartridge comprising a wadding of wooden shavings having a density of substantially 6.5 pounds per cubic foot, said wadding being composed of ribbons substantially one-quarted of an inch wide, and between .007 and .031 inch in thickness.

EARL G. SPANGLER.